W. ROPICKY.
TRANSFORMABLE WHEEL.
APPLICATION FILED OCT. 5, 1918.
1,306,280.
Patented June 10, 1919.
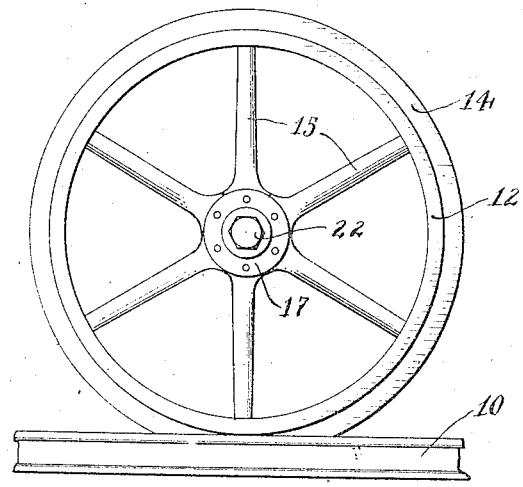
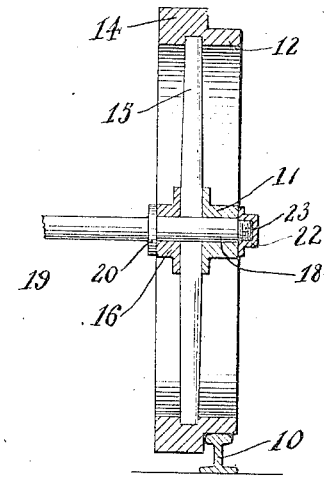
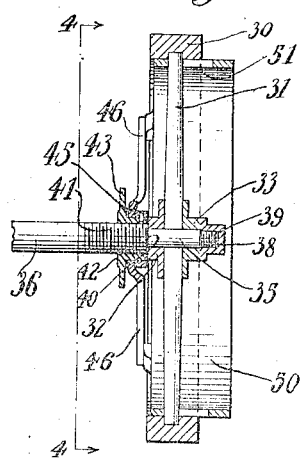
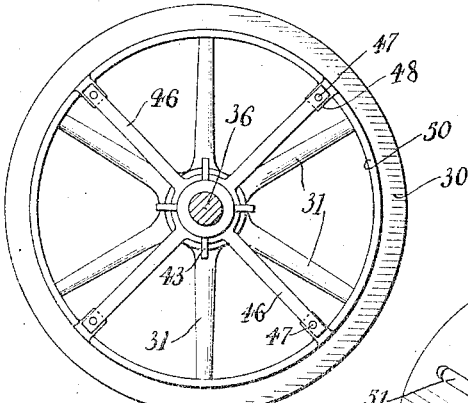
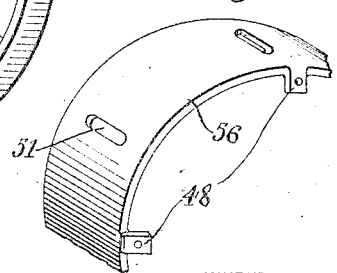
INVENTOR
Wasil Ropicky.
BY Oscar Geier
his ATTORNEY

UNITED STATES PATENT OFFICE.

WASIL ROPICKY, OF DETROIT, MICHIGAN, ASSIGNOR OF ONE-HALF TO JOZEF PTASZEK, OF DETROIT, MICHIGAN.

TRANSFORMABLE WHEEL.

1,306,280.   Specification of Letters Patent.   Patented June 10, 1919.

Application filed October 5, 1918.   Serial No. 256,974.

*To all whom it may concern:*

Be it known that I, WASIL ROPICKY, a subject of the Emperor of Austria, residing at Detroit, county of Wayne, and State of Michigan, have invented certain new and useful Improvements in Transformable Wheels, of which the following is a specification.

This invention relates to improvements in vehicle wheels and particularly to types of wheels adapted to travel over an ordinary roadway or upon the tracks of a railway, so that the vehicle may be guided along a smooth path.

The principal object of the invention is to provide a device which may be integrally formed with the wheel of the rim extending laterally outward, or which may be used in the form of an attachment so that either the ordinary tread of the wheel may be used or the extension which is adapted to travel over the head of rail.

These and other like objects are attained by the novel construction and combination of parts hereinafter described and shown in the accompanying drawings, forming a material part of this disclosure, and in which—

Figure 1 is a side elevational view of a wheel made in accordance with the invention and indicating its application.

Fig. 2 is a vertical sectional view taken substantially through the center of the same.

Fig. 3 is a similar vertical setional view taken through an adaptation of the wheel structure.

Fig. 4 is a transverse secional view taken on line 4—4 of Fig. 3, and

Fig. 5 is a fragmentary perspective view, showing a movable band arranged interiorly of the wheel and adapted to be extended when upon a railway track.

In the drawings the numeral 10, indicates a conventional type of rail, over which the flanged extension 12, formed integrally with the wheel is adapted to make contact. This extension reaches laterally outward from the main port or tread 14 of the wheel, in which are secured a plurality of radial spokes 15, the same being held between an inner flange 16, and an outer flange 17 fixed upon the end 18, of an axle 19, between a fixed collar 20, abutting against the inner side of the inner flange 16, while a nut 22 is screw threaded upon the projecting end 23 of the axle 19.

From the foregoing it will be seen that the tread of the wheel may be used in the ordinary manner, while the flange portion 12, is adapted to make contact with the head of a rail being guided thereon by the larger diameter of the tread portion 14 in contact with the side of the rail head.

In Figs. 3-5 inclusive, an annular tread or rim 30, is mounted upon a plurality of radial spokes 31, the same being held between flanges 32 and 33, fixed upon the stem 35, of an axle 36, in any convenient manner, as for instance the extreme outer end of the flange 33, may be screw threaded, as at 38, and engaged with the similarly threaded end 39 of the axle end.

The inner flange 32 abuts against a shoulder 40 formed near the end of the axle, adjacent to which is a screw threaded portion 41, carrying an internally threaded collar 42, provided with a plurality of projections 43, by which the collar may be turned upon the threaded portion of the axle.

Mounted to rotate upon the threaded collar 42, is a spider hub 45 having arms 46, secured by rivets or like fastenings 47, with radial lugs 48, integral with a rigid band 50, the same being fitted to slide within the inner periphery of the tread 30, and containing elongated slots 51, through which the outer end of the spokes 31 freely pass.

The length of the threaded portion 41 of the axle is such that the sleeve or nut 42 as it is rotated, and by its connections with the arms 31 and lugs 48, moves the band 50 laterally within the tread so that it may be positioned flush with the side of the tread 30 or projected outwardly as shown in Fig. 3, in which position the band is adapted to rest upon the head of a wheel and carry a proportional weight of the vehicle, or the band may be retracted so as to be flush with the outer side of the tread.

Thus there is provided a convenient and readily operated means for transforming a wheel from a type adapted to travel over level surfaces to one which is adapted to engage with the trackway of a railroad in an obvious manner.

Having thus described my invention what I claim as new and desire to secure by Letters Patent, is—

1. In a transformable wheel, the combination with an axle, having screw threads adjacent to the ends thereof, a hub rigidly engaged at the extremity of said axle, a plurality of spokes radiating from said hub, and a rigid annular tread secured at the ends of said spokes, of a band fitted to the interior of said tread, said band having elongated slots through which the ends of said spokes freely pass, lugs formed with said band extending radially inward, an internally screw threaded sleeve engaged upon the threads of said axle, a spider revolubly mounted on said sleeve, and arms formed with said spider engageable with said lugs whereby the band may be moved laterally with respect to said tread.

2. In a transformable wheel, the combination with an axle having screw threaded portions adjacent to the ends thereof, hubs rigidly engaged upon the extremities of said axle, radiating spokes secured in said hub, and an annular tread engaged upon the ends of said spokes, of a band fitted to move in said tread, closely adjacent to its inner surface, said band having a plurality of elongated slots corresponding to the ends of said spokes, lugs extending inwardly from said band from one edge thereof, a screw-threaded sleeve engageable with the threads upon said axle, a spider rotatably mounted on said sleeve, means for rotating said sleeve, arms formed with said spider extending radially outward, and means for engaging said arms with said lugs, whereby said band may be moved laterally with respect to said tread.

In testimony whereof I have affixed my signature.

WASIL ROPICKY.